(12) United States Patent
Gao et al.

(10) Patent No.: US 8,994,740 B2
(45) Date of Patent: Mar. 31, 2015

(54) CACHE LINE ALLOCATION METHOD AND SYSTEM

(75) Inventors: Bingxu Gao, Beijing (CN); Xian Chen, Beijing (CN)

(73) Assignee: VIA Technologies, Inc., New Taipei (TW)

(*) Notice: Subject to any disclaimer, the term of this patent is extended or adjusted under 35 U.S.C. 154(b) by 535 days.

(21) Appl. No.: 13/448,255

(22) Filed: Apr. 16, 2012

(65) Prior Publication Data

US 2012/0268458 A1 Oct. 25, 2012

(30) Foreign Application Priority Data

Apr. 19, 2011 (CN) .......................... 2011 1 0097265

(51) Int. Cl.
*G06F 12/00* (2006.01)
*G06F 12/02* (2006.01)
(Continued)

(52) U.S. Cl.
CPC .............. *G06F 9/38* (2013.01); *G06F 12/0875* (2013.01); *G06F 12/126* (2013.01); *G06T 1/60* (2013.01);
(Continued)

(58) Field of Classification Search
CPC ............... G06T 1/00; G06T 1/60; G06F 9/38; G06F 9/3802; G06F 2212/1016; G06F 2212/452; G06F 12/08; G06F 12/0802; G06F 12/084; G06F 12/0862; G06F 12/0866; G06F 12/0868; G06F 12/0871; G06F 12/0888; G06F 12/0891
USPC .......... 345/543, 557; 711/117, 118, 123, 125, 711/145
See application file for complete search history.

(56) References Cited

U.S. PATENT DOCUMENTS 5,493,667 A * 2/1996 Huck et al. .................... 711/125
5,974,508 A * 10/1999 Maheshwari ................. 711/133
(Continued)

FOREIGN PATENT DOCUMENTS

| CN | 1734431 A | 2/2006 |
|---|---|---|
| TW | 200807242 A1 | 2/2008 |
| TW | 200933524 A | 8/2009 |

OTHER PUBLICATIONS

Chinese Office Action, Application No. 201110097265, dated Mar. 27, 2013.
(Continued)

*Primary Examiner* — Ke Xiao
*Assistant Examiner* — Jed-Justin Imperial
(74) *Attorney, Agent, or Firm* — Donald E. Stout; Stout Uxa & Buyan, LLP (57) ABSTRACT

A cache line allocation method, wherein the cache is coupled to a graphic processing unit and the cache comprising a plurality of cache lines, each cache line stores one of a plurality of instructions the method comprising the steps of: putting the plurality of instructions in whole cache lines; locking the whole cache lines if an instruction size is less than a cache size; locking a first number of cache lines when the instruction size is larger than the cache size and a difference between the instruction size and the cache size is less than or equal to a threshold; and locking a second number of cache lines when the instruction size is larger than the cache size and a difference between the instruction size and the cache size is large than the threshold; wherein the first number is greater than the second number.

22 Claims, 5 Drawing Sheets

(51) Int. Cl.
*G06F 13/00* (2006.01)
*G06F 13/28* (2006.01)
*G09G 5/36* (2006.01)
*G06F 9/38* (2006.01)
*G06F 12/08* (2006.01)
*G06F 12/12* (2006.01)
*G06T 1/60* (2006.01)
*G06T 1/00* (2006.01)

(52) U.S. Cl.
CPC ............... *G06T 1/00* (2013.01); *G06F 12/0897* (2013.01); *G06F 2212/1016* (2013.01); *G06F 12/0886* (2013.01); *G06F 2212/452* (2013.01)
USPC ........... 345/557; 345/543; 711/117; 711/118; 711/123; 711/125; 711/145

(56) References Cited

U.S. PATENT DOCUMENTS

| | | | | |
|---|---|---|---|---|
| 6,438,655 | B1* | 8/2002 | Nicol et al. ................... | 711/136 |
| 6,483,516 | B1* | 11/2002 | Tischler ........................ | 345/552 |
| 8,019,946 | B2* | 9/2011 | Aciicmez et al. ............. | 711/125 |
| 2003/0018855 | A1* | 1/2003 | McWilliams et al. ........ | 711/128 |
| 2005/0198442 | A1 | 9/2005 | Mandler | |
| 2006/0036811 | A1* | 2/2006 | Dieffenderfer et al. ....... | 711/136 |
| 2006/0271745 | A1* | 11/2006 | Vaidya et al. ................. | 711/145 |
| 2008/0022046 | A1* | 1/2008 | Miller ........................... | 711/128 |

OTHER PUBLICATIONS

Office Action dated Nov. 27, 2013 in corresponding Taiwan Application No. 100116644.

* cited by examiner

CACHE LINE ALLOCATION METHOD AND SYSTEM

CROSS-REFERENCE TO RELATED APPLICATIONS

The entire contents of China Patent Application No. 201110097265.4, filed on Apr. 19, 2011, from which this application claims priority, are incorporated herein by reference.

BACKGROUND OF THE INVENTION

1. Field of the Invention

The present invention relates to a cache, and more particularly to a cache line allocation system and method of a three-dimensional graphic shader.

2. Description of Related Art

In ordinary electronic systems, the access speed of the system memory is much slower than the clock speed of CPU. Therefore, it always takes a lot of time waiting for the system memory when the CPU is accessing the system memory. This makes the whole system ineffective. In order to improve the system efficiency, a cache architecture is proposed. With this architecture, a small capacity cache is implemented, such as static random access memory (SRAM), to store the most recently accessed information of CPU. When the requested information has already been stored in the cache, CPU could read the information more quickly from cache instead of from the system memory.

There are two types of information stored in the cache which are data and instructions. In most applications, there is always a large amount of data and a small amount of instructions. The advantages of the cache are more outstanding with instructions than data, because the amount of instructions is always much smaller than the amount of data, and the instructions are more frequently read than the data. Further, for the graphic processing mechanism such as three-dimensional graphic shader, the processing of different pixel data always uses the same instruction group, so the cache architecture is more significant to this kind of graphic processing.

However, the capability of cache in ordinary system is not large enough to store the whole instruction group in one writing operation, which means it is impossible to read the whole instruction group in one reading operation but has to read and write repeatedly. Therefore there would not be any advantages of using the cache. For example, assume that the size of instruction group is 1-instruction-length longer than the size of cache. When processing the first pixel, the instruction group must be read from the system memory and written into the cache. As there is no room for the last instruction, the graphics processing unit must read the system memory again for that last instruction and rewrite the cache to make room for the last instruction. This must result in overwriting another instruction. When processing the second pixel, as the cache has been rewritten, not all the instructions are in the cache when doing the hit determination mechanism, so the whole instruction group must be read from the system memory again. In other words, the graphics processing unit cannot find all the instructions in the cache every time it is processing another pixel, so it must access the system memory more than once to read the whole instruction group in every processing, therefore the above-mentioned advantage becomes a disadvantage.

Therefore, there is a need for a novel cache line allocation system and method to improve the utility efficiency of the cache and the system memory.

SUMMARY OF THE INVENTION

The present invention provides a cache line allocation method. The cache in the present invention is coupled to a graphic processing unit and comprising a plurality of cache lines. Each cache line stores one of a plurality of instructions. The method comprises the steps of: putting the plurality of instructions in whole cache lines; locking the whole cache lines if an instruction size is less than a cache size; locking a first number of cache lines when the instruction size is larger than the cache size and a difference between the instruction size and the cache size is less than or equal to a threshold; and locking a second number of cache lines when the instruction size is larger than the cache size and a difference between the instruction size and the cache size is larger than the threshold; wherein the first number is greater than the second number.

According to the specific construction, a cache line allocation system comprising a cache, a graphic processing unit, and a cache controller. The cache is configured to store a batch of information. The graphic processing unit is coupled to the cache. And the cache controller is coupled to the cache. The cache controller is configured to: putting the plurality of instructions in whole cache lines; locking the whole cache lines if an instruction size is less than a cache size, locking a first number of cache lines when the instruction size is larger than the cache size and a difference between the instruction size and the cache size is less than or equal to a threshold; and locking a second number of cache lines when the instruction size is larger than the cache size and a difference between the instruction size and the cache size is larger than the threshold, and wherein the first number is greater than the second number.

DETAILED DESCRIPTION OF EMBODIMENTS

Figure 1:
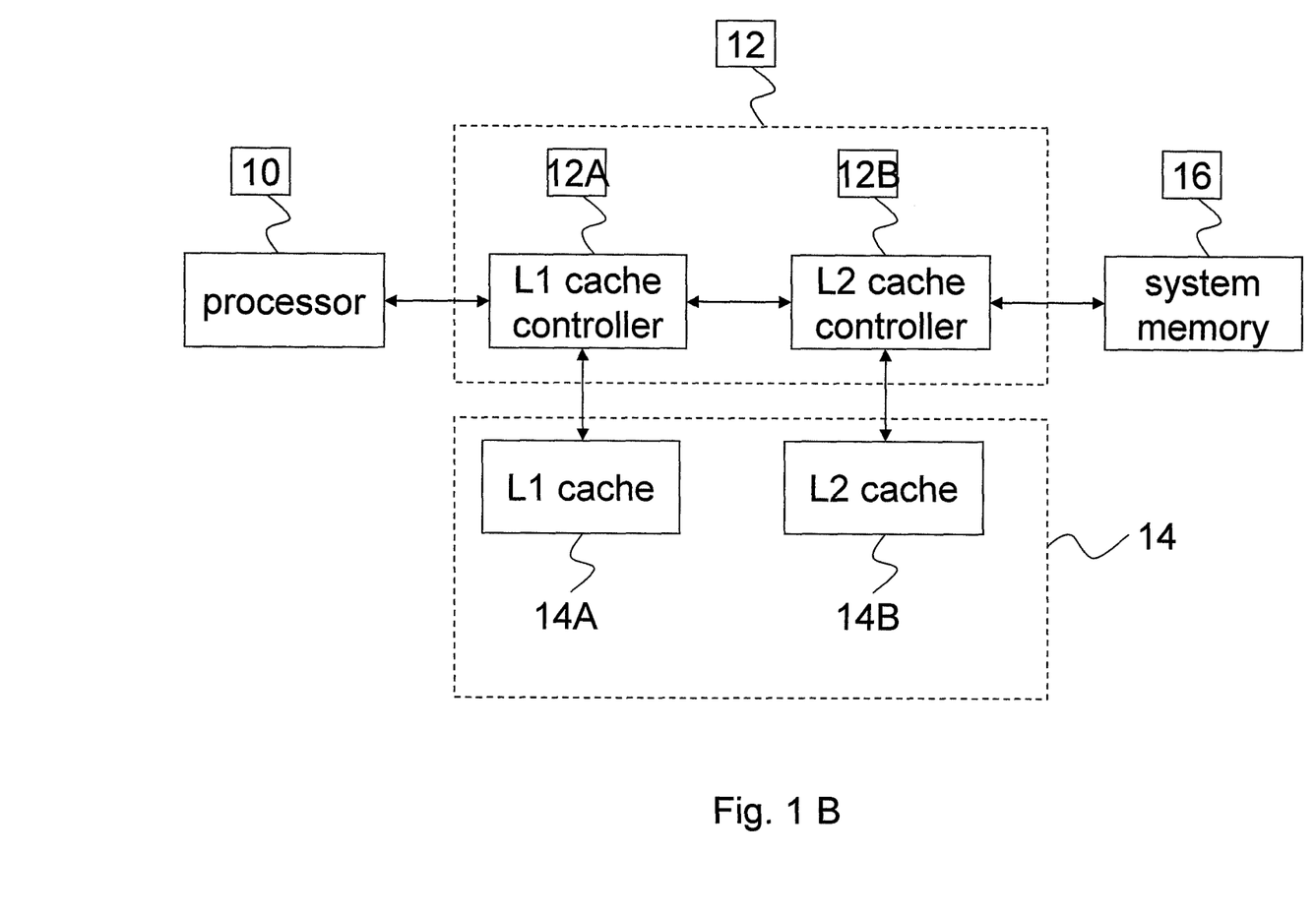
FIG. 1A is a block diagram showing the cache line allocation system according to one embodiment of the present invention.
FIG. 1B is a block diagram showing the cache line allocation system according to another embodiment of the present invention.
Figure 1A:
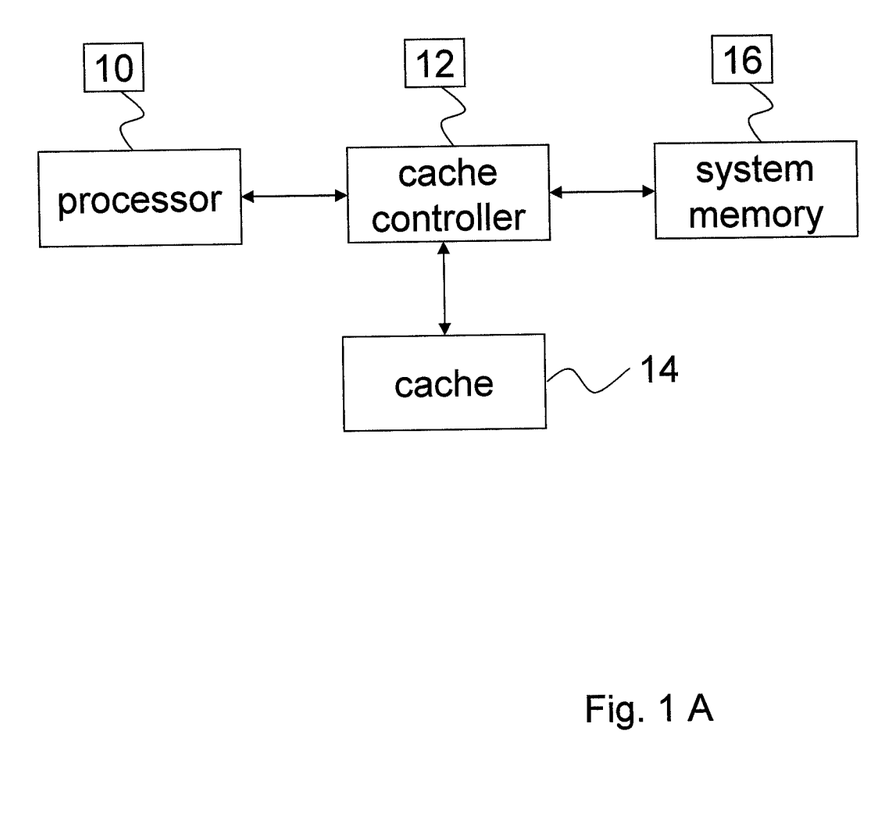

FIG. 1A is a block diagram showing the cache line allocation system of the present invention. Although the embodiment gives three-dimensional graphic shader as an example, the present invention may be applied to other applications. In this embodiment, processer 10 is a graphics processing unit (GPU), which assists CPU (not shown) to accelerate the graphic processing. Processer 10 performs information accessing on cache 14 and system memory 16 via a cache controller 12. Cache 14 may be a static random access memory (SRAM), the accessing speed of which is faster than the system memory 16 such as dynamic random access memory (DRAM). The cache controller 12 and cache 14 may be integrated on the same chip with processor 10, but it should be understood that the disclosure is not limited thereto. In this embodiment, cache 14 is used as an instruction cache, to store the instructions used by the graphic processing unit to process a three-dimensional graph, but it should be understood that the disclosure is not limited thereto. The three-dimensional graphic shader in this embodiment adopts multithreading operations which means that processer 10 performs more than one processing on the according pixel data simultaneity since every pixel may be performed the same instructions. Further, cache 14 in this embodiment may also be a "multiway" cache, which divides the whole memory space into a plurality of blocks to reduce the complexity of the judging logical circuit.

FIG. 1B is a block diagram showing the cache line allocation system according to another embodiment of the present invention. In this embodiment, the cache which is similar to the cache 14 in FIG. 1A may have two levels, which are a first level cache (named the L1 cache in general) 14A and a second level cache (named the L2 cache in general) 14B. The L1 cache and the L2 cache are controlled by a first level cache controller 12A and a second level cache 12B respectively. In this embodiment the cache controller as the cache controller 12 in FIG. 1A also has two levels: the first level cache controller 12A and the first level cache 14A. The first level cache controller 12A and the first level cache 14A may be integrated in the same chip with processor 10, but it should be understood that the disclosure is not limited thereto. The cache allocation method of the present invention may be implemented in the first level cache controller 12A and the first level cache 14A, but it should be understood that the disclosure is not limited thereto.

Figure 2:
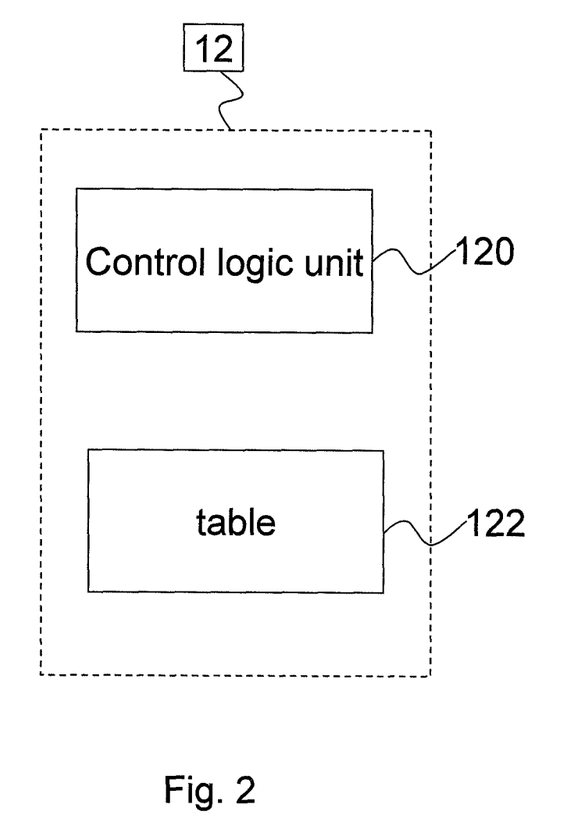
FIG. 2 is a block diagram showing the detail of the cache controller of FIG. 1A/B according to the present invention.

FIG. 2 is a block diagram showing the detail of the cache controller 12 which includes a control logic unit 120 and a table 122. Control logic unit 120 provides the communication interface to the controller 10, the cache 14, and the system memory 16. Table 122 is coupled to the control logic unit 120, and is used for keeping a record for all the information, such as instructions or pixel data, stored in the cache controller 12. In this embodiment, the contents of table 122 are not only the addresses of all the information in system memory 16, but also a lock flag and a replacement value of every line in cache 14, wherein, the lock flag is the flag identifying whether the corresponding line in cache 14 is locked. When a line is locked, the corresponding lock flag turned to "locked" to prevent the information stored in the line from being overwritten, but the information could still be accessed by the system memory. The replacement value is the judgment basis of whether the information in an unlocked line in cache 14 should be overwritten. This embodiment uses "least recently used, LRU" algorithm, to trace the access frequency of each of the plurality of information, to get a LRU displacement value. The lock flag and the replacement value will be discussed in more detail combined with the embodiments in the following description.

Figure 3:
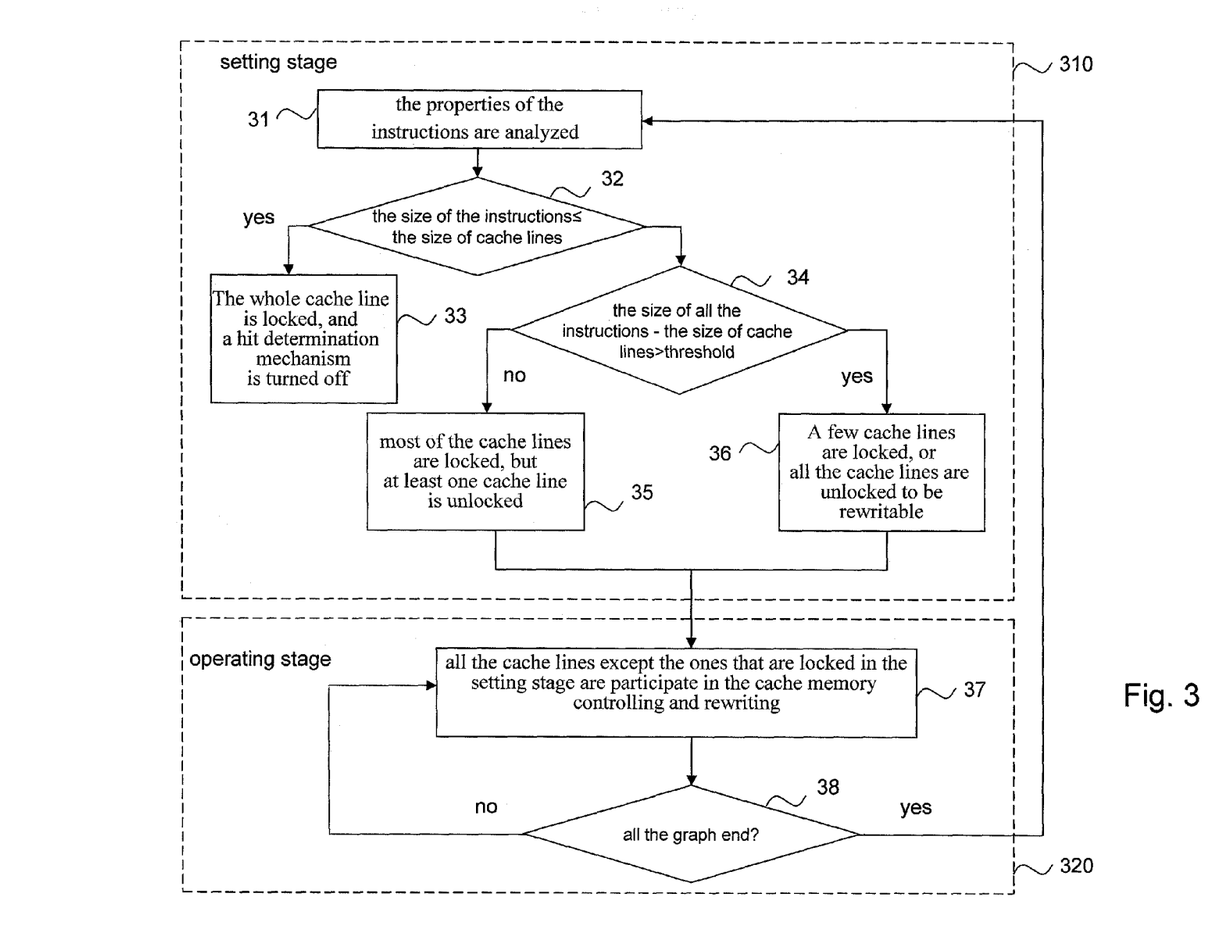
FIG. 3 is a flow chart showing the cache line allocation method according to one embodiment of the present invention.

FIG. 3 is a flow chart showing the cache allocation method of cache 14 according to one embodiment of the present invention. The flow is divided into two stages, the setting stage 310 and the operating stage 320.

At first, in setting stage 310, at step 31, the properties of a plurality of information, such as length, the category and the distribution of the instructions, are analyzed by the CPU (not shown). In this embodiment, the information is a plurality of instructions used by the graphic processing unit to process a three-dimensional graph, but it should be understood that the disclosure is not limited thereto. Then, at step 32, if the length of the batch of information is larger than the length of cache 14 is determined by the CPU. If the length of the batch of information is less than or equal to the length of cache 14, cache 14 may store all the information at one time. In this case, as shown in step 33, all the lines in cache 14 are locked, and the lock flags of all cache lines are modified to "locked." Therefore, in the following information accessing operations, the corresponding information may be accessed directly in cache 14 without accessing the system memory 16. Since there is not any rewriting operations in the cache lines, a hit determination mechanism of cache 14 can be turned off. The hit determination mechanism is a common method in the art, which means the CPU accessed through the whole cache until it finds the aimed information. In the embodiment, the plurality of instructions would be accessed every time processing a pixel. Therefore, in the following operations, processor 10 may access cache 14 directly and there is no need to determine every time whether these instructions can be accessed in cache 14. The power consumption and the time spent on reading could be both decreased at the same time. If the length of the plurality of information is larger than the length of cache 14, the process goes to step 34. At step 34, whether the difference between the length of the plurality of information and the length of cache 14 is greater than a presupposed critical value is determined, wherein the presupposed critical value is positive and variable. If the result of step 34 is no, the length of the plurality of information is a little bit longer than the length of cache 14. Then, at step 35, more than a half of all the cache lines or most of the cache lines are locked, e.g. at least one cache line in cache 14 is reserved to unlocked, and the other cache lines are locked. Therefore, the information in the locked lines could be read from cache 14 directly in the following applications without accessing the system memory, so the information transmissions of system memory could be decreased and the meaningless updating and rewriting of cache 14 could be effectively reduced. Comparing to the conventional approach in which every line is unlocked, the time spent on reading is greatly reduced and the hit rate is increased. On the other hand, the unlocked cache lines are reserved for alternatively writing the following information read from system memory 16. If the result of step 34 is yes, the length of the plurality of information is much larger than the length of cache 14. Then, at step 36, less than the half of all the cache lines or a few lines in cache 14 may be locked. In some conditions, all of the lines in cache 14 may be unlocked. More cache lines, or up to all the lines in cache 14 are reserved to be unlocked to participate in alternative writing. For example, the length of the cache is 256, and the presupposed critical value is 20. If the length of the plurality of information is 270, because 270−256<20, which means the length of the plurality of information is a little bit longer than the length of cache 14, in this condition, most of the lines, for example, 240 lines may be locked, and only 30 instructions may occupy 16 unlocked lines alternatively. On the other hand, the length of the cache is still 256, the presupposed critical value is still 20, but the length of the plurality of information is 1000. 1000−256>20, which means the length of the plurality of information is much longer than the length of cache 14. In this case, if most lines, for example 240 lines, are locked, there would be 760 instructions occupying the 16 unlocked lines alternatively, then, on the contrary, the system performance may be degraded. So when the length of the plurality of information is much longer than the length of cache 14, a few lines should be locked, for example 128 or even less. Then, the setting stage 310 ends, and the process may enter into the operating stage 320.

In the operating stage 320, first of all, at step 37, the instructions in the locked lines may not be overwritten, and the overwriting may only be performed on the instructions in the unlocked lines. Generally, the information which has a higher using frequency would be locked. For example, if an instruction may be used by every pixel, then its using frequency may be 100%. The instructions have a higher using frequency like that should get the corresponding line locked. If an instruction is in an "if . . . else" judge branch, assume its using frequency to be 50% for simplicity, then its using frequency is lower, so its corresponding line may not be locked. The replacement value of the unlocked line may be set significant, and every time the information in the line is read, the replacement value may increase by one. Then the information that in the line with a larger replacement value may be read more frequently, and the information that in the line with a smaller replacement value may be read less frequently. The instructions in unlocked cache lines which should be replaced by the new accessing instructions from the system memory 16 may be determined upon the replacement value. The replacement value is LRU replacement value in this embodiment. Therefore, in the following writing operations, the new information may be used to overwrite the lines with the smaller replacement value in cache 14. In this way, the information that has a high reading frequency may be replaced less often, therefore in the unlocked lines, the meaningless information updating and rewriting of the cache could also be effectively reduced, and the hit rate could also be increased. Because the whole system memory accessing frequency is reduced, the bandwidth usage effectiveness of the system memory is improved. At step 38, whether all the pixels have been processed is determined. If the result is "no," the process enters to step 37. If the result is "yes," the cache access operation for processing one graph is ended. The progress may go back to setting stage 310, for accessing the cache 14 to processing a new graph.

Figure 4:
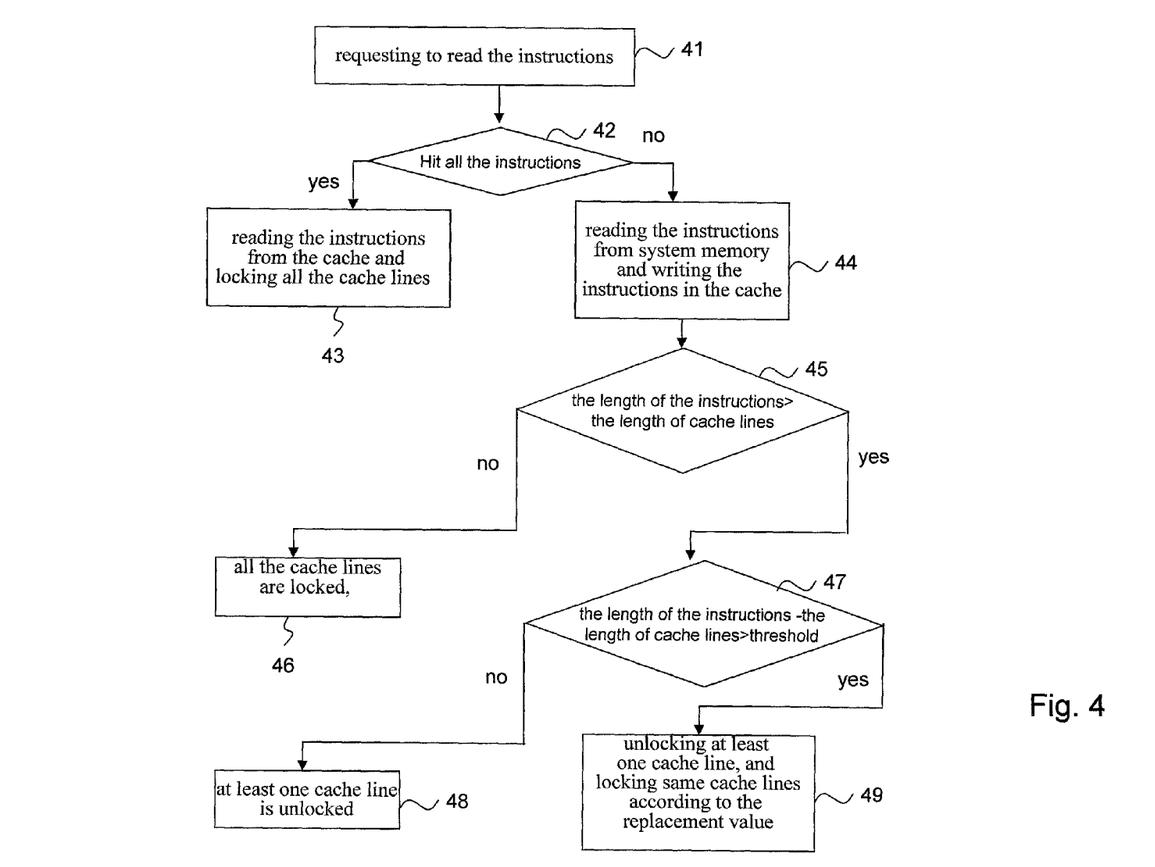
FIG. 4 is a flow chart showing the cache line allocation method according to another embodiment of the present invention.

FIG. 4 is a flow chart showing the cache allocation method according to another embodiment of the present invention. First of all, at step 41, processor 10 may send the instruction reading request to cache controller 12, to ask for at least one instruction. Then, at step 42, the control logic unit 120 of cache controller 12 may determine whether the requested instruction is stored in cache 14 based on table 122. If the result of step 42 is "yes" which means the instruction is in the cache 14, then cache controller 12 may get the requested instruction from cache 14 to provide it to processor 10, and in step 43, all the instructions in cache 14 may be locked. On the other hand, if the result of step 42 is "no" which means the instruction is not in the cache 14, then, in step 44, cache controller 12 may access system memory 16 for the requested instruction, then provide it to processer 10, store the instruction in cache 14 and update the table 122.

Next, at step 45, whether the length of the plurality of instructions is larger than the length of cache 14 is determined. If the result is "no," then all the instructions wrote in step 44 may be locked. That is in step 46, the lock flags of corresponding lines in table 122 are set to be "locked."

If the result of step 45 is "yes," then enters to step 47, whether the difference between the length of the plurality of instructions and the length of cache 14 is greater than a presupposed critical value is determined. If the result of step 47 is "no," the length of instructions is a little bit larger than the length of cache 14. Then, at step 48, a few lines, or at least one line in cache 14 are reserved unlocked, and the other instruction is locked. The unlocked cache lines, on the other hand, are used for following instructions replacement with system memory 16.

If the result of step 47 is "yes," the length of instructions is much longer than the length of cache 14, then, a few lines in cache 14 may be locked, and most of the lines are unlocked lines. The unlocked cache lines are used for following replacement operations. When a line is determined to be an unlocked line and may perform the following replacement operations, the replacement value corresponding to that line may be set as significant. In step 49, the instructions in unlocked cache lines that should be replaced by the new accessing instructions from the system memory 16 may be determined upon the replacement value, as discussed above reference to FIG. 3.

Using the above process flows of the embodiments of the present invention, the accessing frequency of system memory 16 is effectively reduced, and a hit rate of cache 14 is greatly increased. The hit rate is a value which expresses the rate of obtaining the aimed information from the cache in one accessing operation. Especially for the processing of different pixels or different graphs, as the same instructions may be used, the advantages of the present invention are more obvious. The following is an example showing the efficiency improvement of the present invention compared to the conventional approach. Assuming the length of the cache is 256, and the length of shader instructions is 257. Based on the allocation method of cache in conventional approach, when processing the first pixel, the first 256 instructions may be written into the cache in turn from system memory, to be processed by graphics processing unit. When it comes to the $257^{th}$ instruction, that instruction may be written into the first cache line and the first instruction may be overwritten. When processing the second pixel, because the first instruction could not be found in the cache, the first to the $256^{th}$ instruction must be read from the system memory a second time. For the graphic that has an analyzing degree of 1280×1024, there would be a total 1280×1240×257 times of system memory accessing, which is 336,855,040 times of accessing. For the same example, if using the embodiment of the present invention, the first 256 instructions may be written into cache 14 from system memory 16 in turn, the first 255 instructions may be locked in the first 255 cache lines, and the $256^{th}$ instruction line may reserved to be unlocked. When it comes to the $257^{th}$ instruction, that instruction may be written into the unlocked line in cache 14 from system memory 16. Next, when processing the second pixel, because the first to the $255^{th}$ instruction have already been locked in cache 14, there only need to read the $256^{th}$ and the $257^{th}$ instruction in turn from system memory 16. The third and the following pixels would have the same operations. Therefore, there are 257+(1280×1024−1)*2 times of accessing to the system memory 16, which is 2,621,695 times of accessing. Comparing to the conventional approach, the effectiveness of the present invention has improved by 128 times.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A cache line allocation method, wherein a cache is coupled to a graphic processing unit and the cache comprising a plurality of cache lines, each cache line stores one of a plurality of instructions the method comprising the steps of:

putting the plurality of instructions in whole cache lines;
locking the whole cache lines if an instruction size is less than a cache size;
locking a first number of cache lines when the instruction size is larger than the cache size and a difference between the instruction size and the cache size is less than or equal to a threshold; and
locking a second number of cache lines when the instruction size is larger than the cache size and a difference between the instruction size and the cache size is larger than the threshold;
wherein the first number is greater than the second number.

2. The method according to claim 1, wherein:
the first number of cache lines is more than a half of the whole cache lines; and
the second number of cache lines is less than a half of the whole cache lines.

3. The method according to claim 1, wherein the threshold is one of the following items or the combination thereof:
a variable value; and
a positive number.

4. The method according to claim 1, wherein the step of locking the first number of cache lines comprises a step of overwriting unlocked cache lines with instructions different from that are stored in the locked cache lines.

5. The method according to claim 1, wherein the step of locking the second number of cache lines comprises a step of overwriting unlocked cache lines with instructions different from that are stored in the locked cache lines.

6. The method according to claim 1, wherein the cache comprises a table having a plurality of flags, and each of the plurality of cache lines is configured to indicate whether a corresponding cache line is locked.

7. The method according to claim 1, wherein a using frequency of the instruction in a locked cache line is higher than the instruction in an unlocked cache line.

8. The method according to claim 7, wherein: every cache line has a corresponding replacement value and the second number of cache lines is locked based on the corresponding replacement values, and wherein the replacement value is related to the using frequency.

9. The method according to claim 1, wherein the instructions in the locked cache lines is not overwritten and is accessed at least once.

10. The method according to claim 1, wherein a hit determination mechanism is turned off if whole the cache is locked.

11. The method according to claim 1, wherein the plurality of instructions is used by the graphic processing unit to process a three-dimensional graph.

12. A cache line allocation system comprising:
a cache configured to store a plurality of instructions;
a graphic processing unit coupled to the cache; and
a cache controller coupled to the cache, configured to:
putting the plurality of instructions in whole cache lines;
locking the whole cache lines if an instruction size is less than a cache size;
locking a first number of cache lines when the instruction size is larger than the cache size and a difference between the instruction size and the cache size is less than or equal to a threshold; and
locking a second number of cache lines when the instruction size is larger than the cache size and a difference between the instruction size and the cache size is larger than the threshold;
wherein the first number is greater than the second number.

13. The cache line allocation system according to claim 12, wherein:
the first number of cache lines is more than a half of the whole cache lines; and
the second number of cache lines is less than a half of the whole cache lines.

14. The cache line allocation system according to claim 12, wherein the threshold is one of the following items or the combination thereof:
a variable value; and
a positive number.

15. The cache line allocation system according to claim 12, wherein the cache controller is further configured to:
overwriting unlocked cache lines with instructions different from that are stored in the locked cache lines in the step of locking the first number of cache lines.

16. The cache line allocation system according to claim 12, wherein the cache controller is further configured to:
overwriting unlocked cache lines with instructions different from that are stored in the locked cache lines in the step of locking the second number of cache lines.

17. The cache line allocation system according to claim 12, wherein the cache comprises a table having a plurality of flags, and each of the plurality of cache lines is configured to indicate whether a corresponding cache line is locked.

18. The cache line allocation system according to claim 12, wherein a using frequency of the instruction in a locked cache line is higher than the instruction in an unlocked cache line.

19. The cache line allocation system according to claim 18, wherein the cache further configured to every cache line has a corresponding replacement value and the second number of cache lines is locked based on the corresponding replacement values, and wherein the replacement value is related to the using frequency.

20. The cache line allocation system according to claim 12, wherein the instructions in the locked cache lines is not overwritten and is accessed at least once.

21. The cache line allocation system according to claim 12, wherein a hit determination mechanism is turned off if whole the cache is locked.

22. The cache line allocation system according to claim 12, wherein the plurality of instructions is used by the graphic processing unit to process a three-dimensional graph.

* * * * *